Nov. 10, 1959   R. C. STRAUSS   2,912,081
DRIVING CONTROLS

Filed March 26, 1951   6 Sheets-Sheet 1

INVENTOR.
RAYMOND C. STRAUSS
BY
Harness, Dickey & Pierce.
ATTORNEYS.

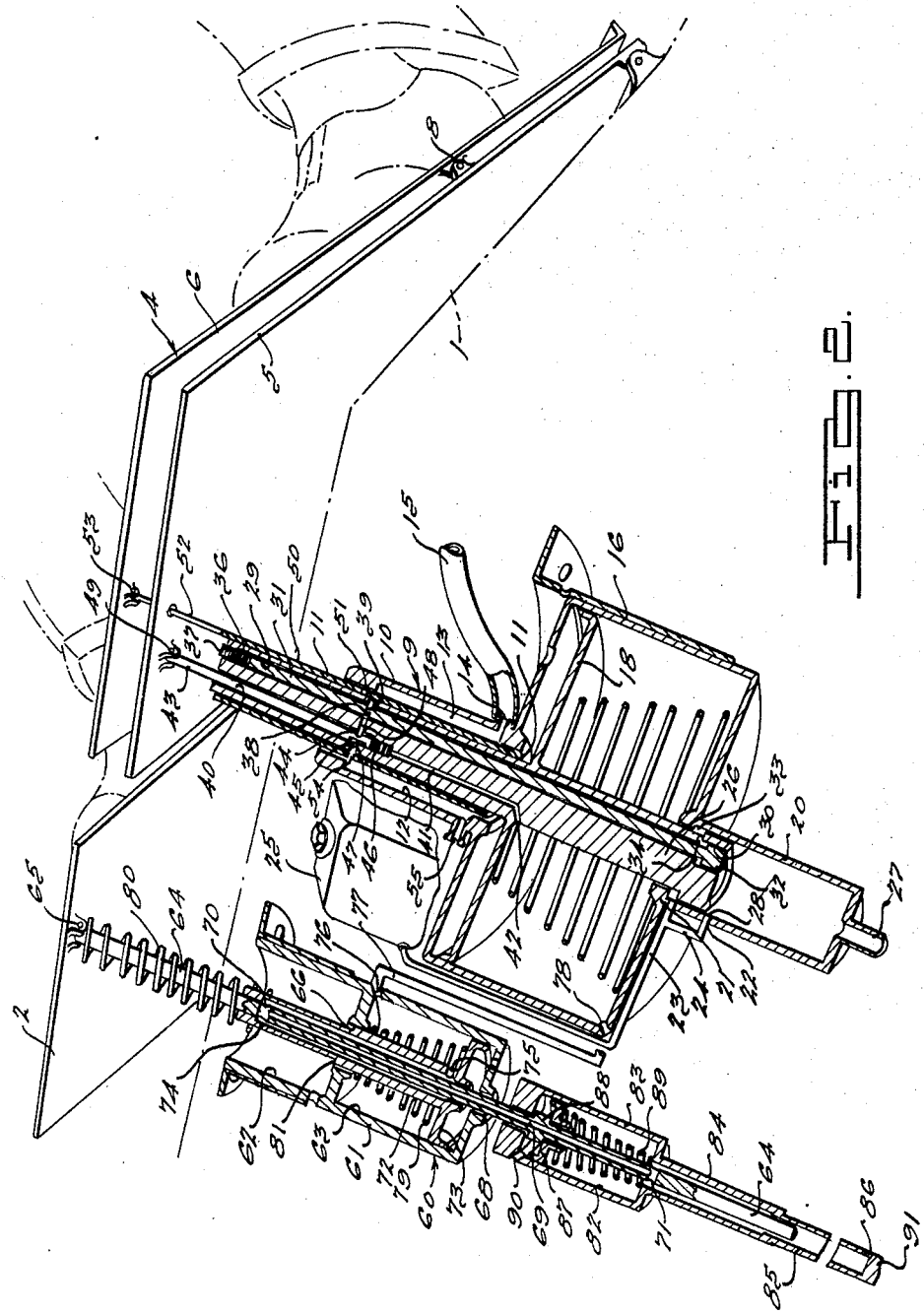

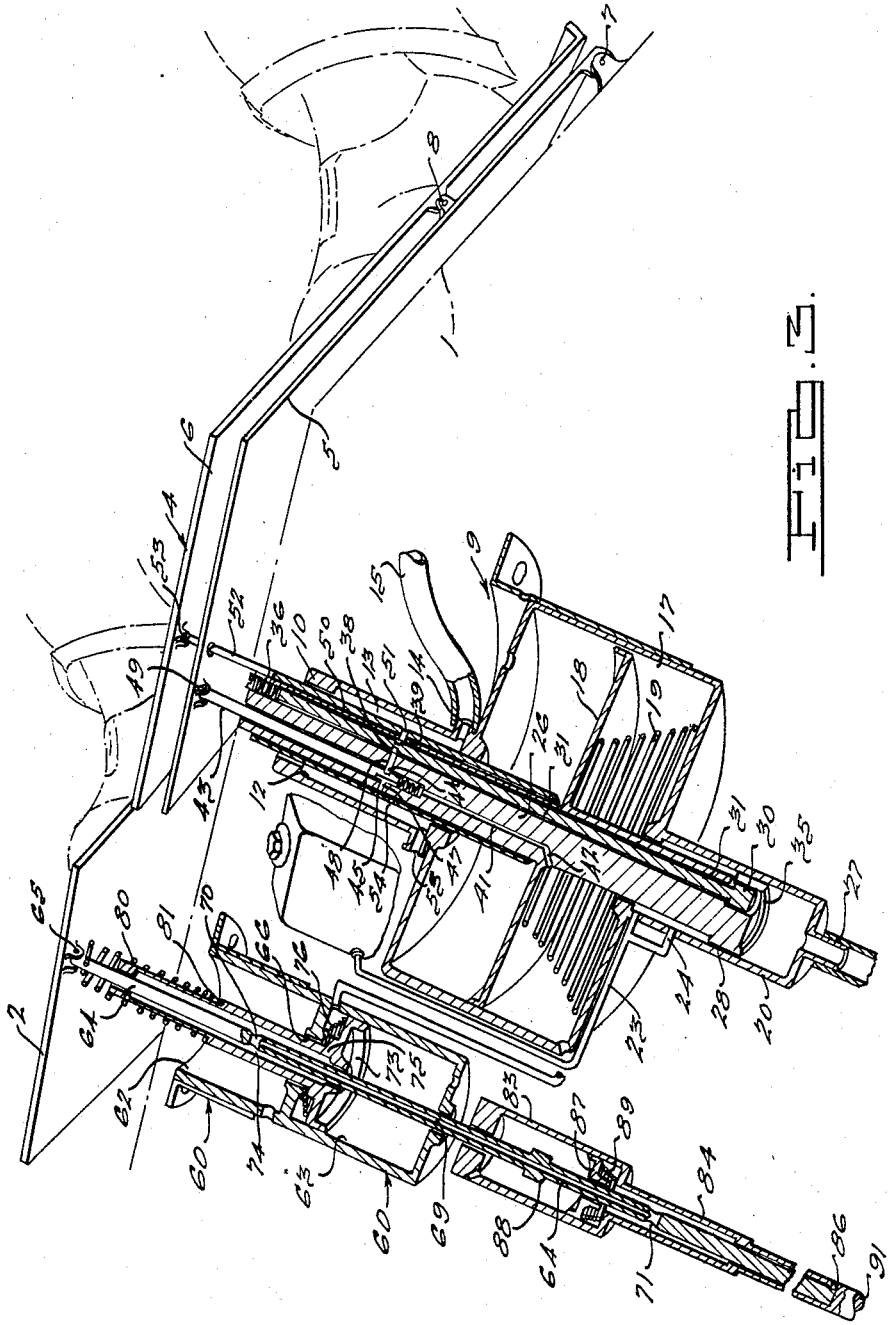

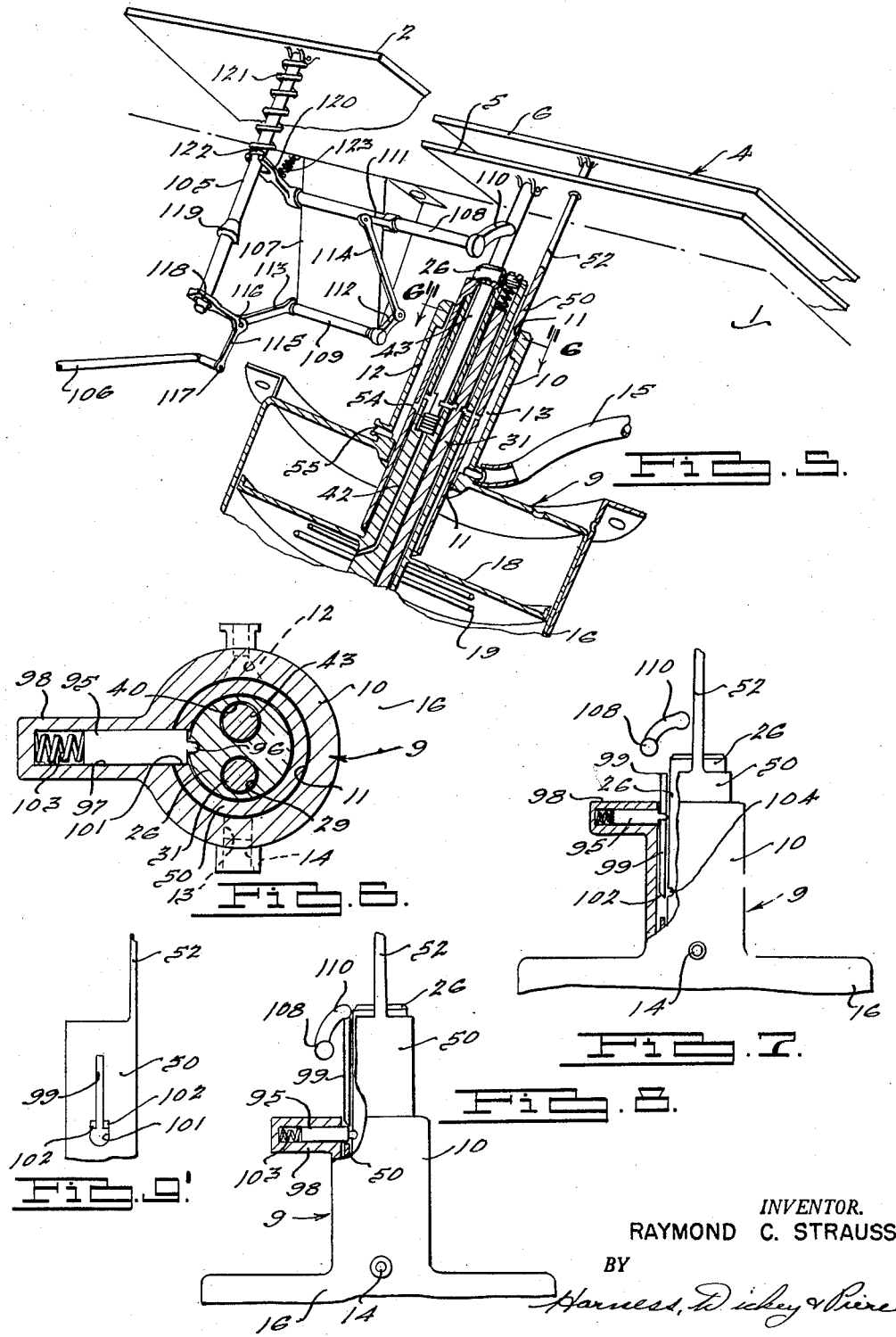

Nov. 10, 1959   R. C. STRAUSS   2,912,081
DRIVING CONTROLS
Filed March 26, 1951   6 Sheets-Sheet 5
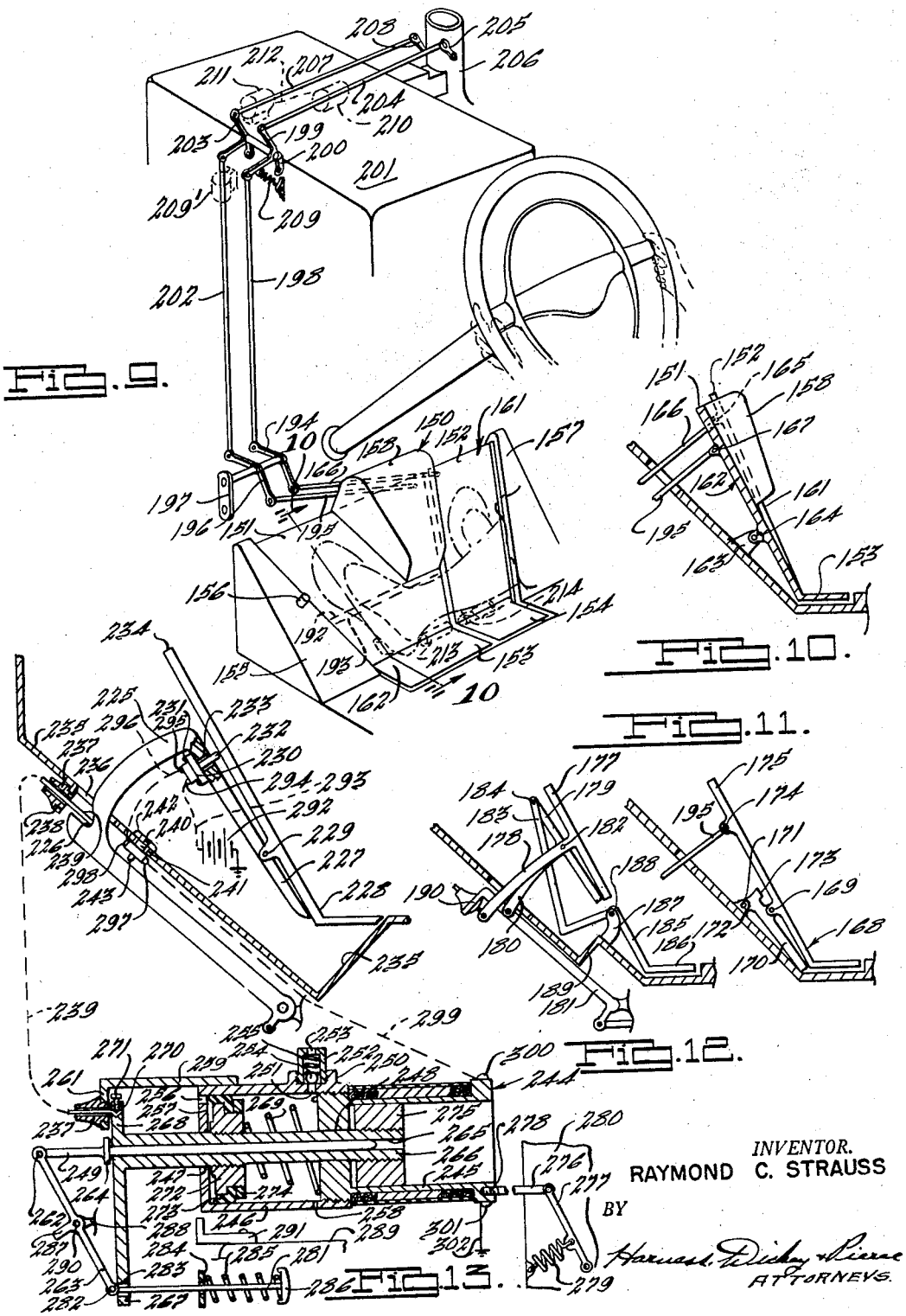
INVENTOR.
RAYMOND C. STRAUSS
BY
Harness, Dickey & Pierce
ATTORNEYS.

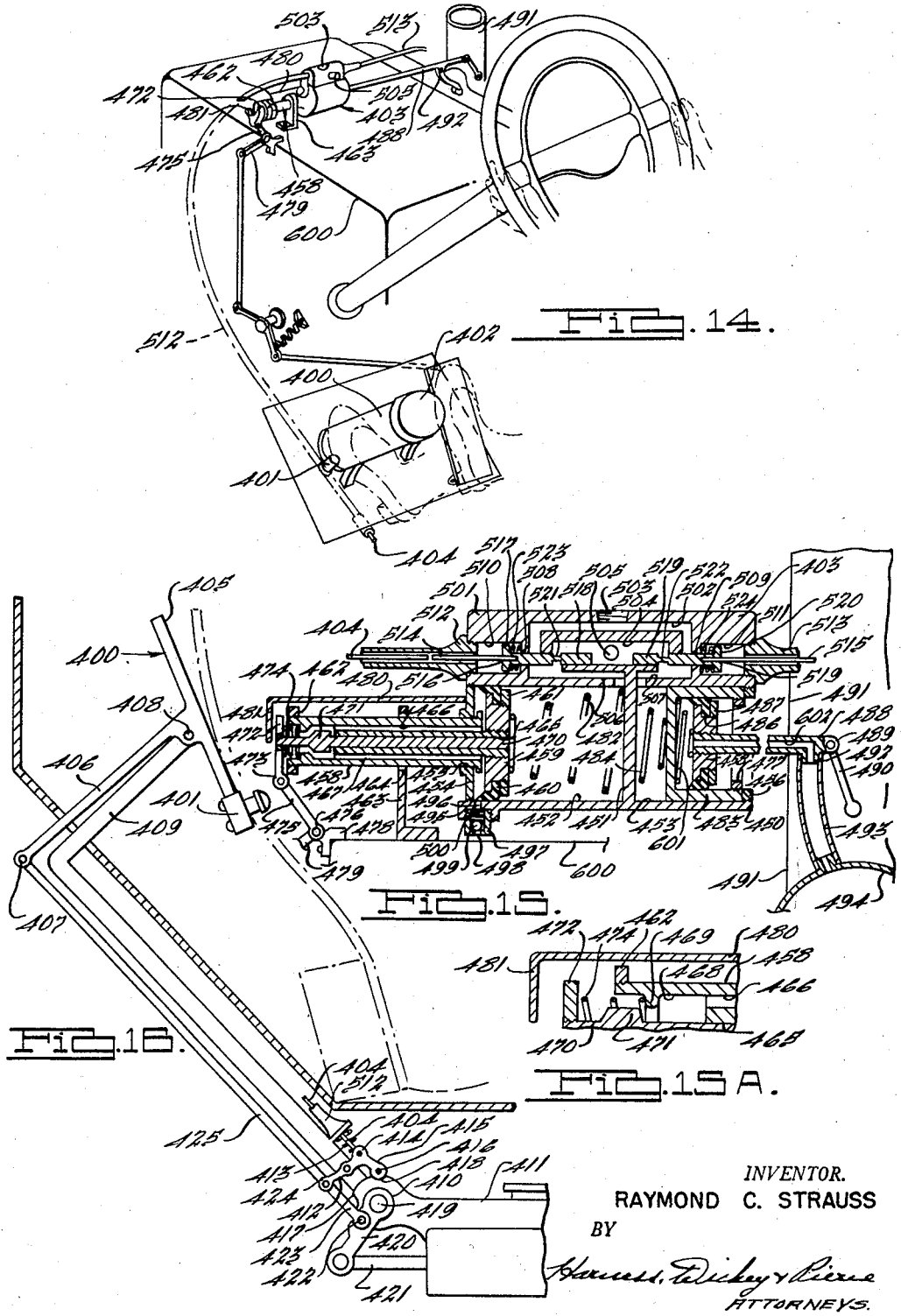

United States Patent Office 2,912,081
Patented Nov. 10, 1959

2,912,081

DRIVING CONTROLS

Ray C. Strauss, Ann Arbor, Mich.

Application March 26, 1951, Serial No. 217,620

40 Claims. (Cl. 192—3)

This invention relates to improvements in motor vehicle controls and in particular to controls for operating the braking and fuel feed systems. This application is a continuation-in-part of copending application Serial No. 609,796, filed August 9, 1945, now abandoned.

One of the primary objects of the present invention is to provide improvements in controls of the type mentioned whereby the lifting of the foot from the floor to the brake or from the accelerator to the brake is eliminated thereby reducing considerably the time and effort required to apply the brake or accelerate the car.

A further object of the invention is to provide improvements in controls of the type mentioned whereby the danger of feeding fuel to the engine when the brake is applied is eliminated.

Another object of the invention is to provide improvements in vehicle controls whereby creeping of the fluid drive is prevented through easy brake application and also whereby a convenient hill-hold or no-back feature on the incline is provided.

A further object of the invention is to provide improvements in controls of the type mentioned which permit a full throttle for quick get-away when the brake is released in that while the accelerator is rendered ineffectual when the brake is applied it is restored to any effective functioning position when the brake is released.

A further object of the invention is to provide improvements in controls of the type mentioned which permit convenient left-foot braking, especially in cars wherein the foot operated clutch has been eliminated, thereby dividing the work between the right and the left foot.

A further object of the invention is to provide improvements in controls of the type mentioned whereby the operator's feet may be positioned at all times on the brake and accelerator pedals and by which the control over the vehicle is maintained without the need for teaching new driving habits.

A further object of the invention is to provide improvements in the brake actuating means and the accelerator pedal in that by their construction and arrangement with respect to each other the feet are in position to obtain the desired control at all times thereby providing safety features.

Other objects of the invention will become apparent from the following specification, the drawings relating thereto and from the claims hereafter set forth.

In the drawings, in which like numerals are used to designate like parts in the several views throughout:

Fig. 2 is a perspective view with parts in cross-section, of the braking and accelerating means, the control means therefor, and their relationship to each other, illustrating one embodiment of the present invention;

Fig. 3 is a view similar to Fig. 2 and showing the parts in different operating positions;

Fig. 5 is a view similar to Fig. 4 and illustrating the parts in a different operating position;

Fig. 6 is a cross-sectional view taken substantially along the line 6—7 of Fig. 5;

Fig. 7 is a side-elevational view of the structure shown in Fig. 6 with parts broken away and showing parts in elevation;

Fig. 8 is a view similar to Fig. 7 and showing the parts in a different operating position;

Fig. 9 is a diagrammatic perspective view of another form of the invention;

Fig. 9' is a partial elevational view of the valve sleeve, one of the elements in the structure shown in Figs. 6, 7 and 8;

Fig. 10 is a section taken on line 10—10 of Fig. 9;

Figs. 11 and 12 show side views of two other forms of brake treadles;

Fig. 13 is a diagrammatic cross-section of another form of the invention;

Fig. 14 is a diagrammatic perspective view of another form of the invention;

Fig. 15 is an axial section through a modified form of the invention including a means for automatically regulating the throttle to accommodate load changes on automatic transmissions;

Fig. 15a is an enlarged view of the left hand corner of Fig. 15; and

Fig. 16 is another modification of the invention.

Figure 1:
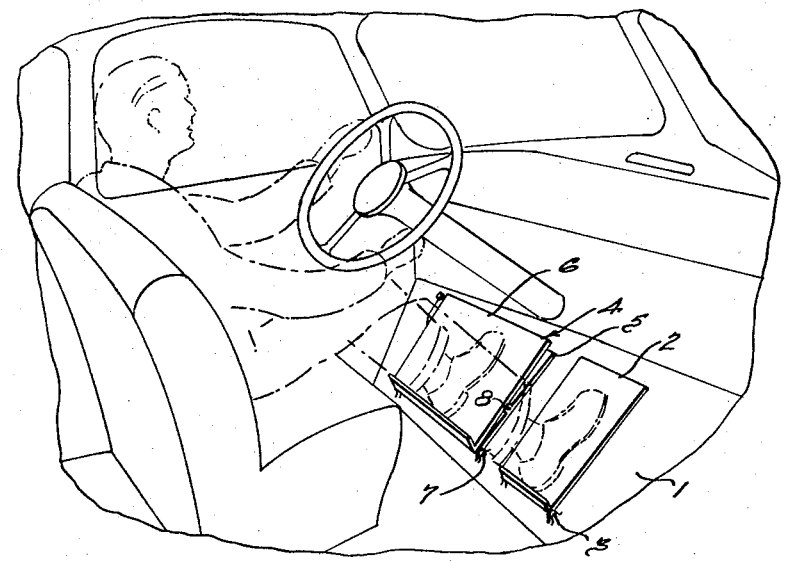
Figure 1 is a perspective view of a portion of the driver's compartment of an automotive vehicle and illustrating the brake and accelerator actuating members in their positions therein.

Referring to the drawings and referring particularly to Figs. 1, 2 and 3 thereof, one embodiment of the present invention is illustrated. In Fig. 1 the driver's compartment of a conventional automotive vehicle is illustrated and includes the usual inclined floor board 1. An accelerator pedal or treadle 2 is shown which is pivotally mounted to the floor board 1 by a pivot 3. The pivot 3 may be suitably supported by brackets fixed to the floor board 1. The pedal 2 is conveniently located for the right foot of the operator. A compound brake actuating means is generally indicated at 4 and is disposed beside the accelerator pedal 2 and in a position to be conveniently reached by the operator's left foot. The brake actuating means 4 comprises a lower platen 5 and an upper platen 6 superimposed thereover. The lower platen 5 is pivotally interconnected along the lower edge thereof by means of pivot 7 to the floor board 1 for pivotal movement about the pivot 7 toward the floor board. Platen 6 is pivotally connected to platen 5 by pivots 8. The pivots 8 may be pins extending through aligned lugs formed on the platens 5 and 6. Pivots 8 provide for pivoting platen 6 relative to the platen 5 about an axis parallel to the axis of pivots 7. Pivots 8 are so located that by the natural tilting forward of the operator's toe in applying the brake the upper edge of the platen 6 is moved downwardly toward platen 5.

The accelerator pedal 2 and platen 6 are formed with upturned flanges around the lower edges thereof so as to provide a rest or stop for the backs of the operator's heels.

A brake actuating and control means is generally indicated at 9, and in the embodiment illustrated is of the vacuum power type. Such control means 9 is fixed to the vehicle in a suitable way under the floor board 1. Certain of the details thereof are also shown in Figs. 6 to 9. It will be appreciated, however, that it could be one of other types, such as a hydraulic type or air-pressure type, according to the broader aspects of the present invention.

A control means 9 comprises a main body having an upper cylindrical portion 10 provided with an axial bore 11 therethrough. Diametrically opposed, longitudinally extending grooves 12 and 13 are found in the bore 11 providing separate chambers. An opening or port 14 is formed through the member 10 communicating with chamber 13 and is provided with a connector portion adapted to have a vacuum tube 15 connected thereto. The vacuum tube 15 leads to a suitable source of vacuum such as a vacuum accumulator which in turn is connected to the exhaust manifold in the usual way.

The control means 9 also includes an enlarged cylindrical portion 16 providing a chamber 17 adapted to reciprocably receive a power piston 18 therein. A coil spring 19 is disposed within the chamber 17 with the upper end thereof resiliently bearing against the underside of the piston 18 and the lower end thereof abutting against the bottom of the cylinder 16. The function of spring 19 will be described hereinafter.

A master brake cylinder 20 of the conventional type is formed on or attached to the bottom of cylinder 16 adjacent an axial opening 21 formed in the bottom of cylinder 16. Master cylinder 20 has ports 21 and 22 communicating through conduits 23 and 24 with a brake fluid reservoir 25.

A combined brake operating plunger and follower valve 26 is reciprocably received within the master cylinder 20 for forcing the brake fluid through conduit 27 which leads to conduits for the individual brakes in the usual way. Plunger 26 extends upwardly through opening 21 within bore 11 and has an enlarged lower end 28 which acts as the master cylinder plunger.

Plunger 18 is also either formed integral with or fixed to the plunger 26. Plunger 26 is formed with a longitudinal bore 29 therethrough which terminates in an enlarged cylinder portion 30 adjacent the lower end thereof. A rod member 31 having an enlarged cylindrical lower end 32 is received within the bore 29 with the enlarged cylindrical end 32 received within the enlarged portion 30.

The axial length of the enlarged portion 32 is slightly less than the length of the axial length of the enlarged portion 30 and the space above the enlarged portion 32 communicates with the space indicated at 33 within the master cylinder 20 above the enlarged piston 28 through the port 34. The member 31 is retained in the assembly by means of a tab 35 (Fig. 3).

Upward movement of the rod 31 is adjustably resisted by means of a spring 36 which is disposed in the upper end of bore 29 and held in place by means of a set screw 37.

Member 31 is also formed with an annular recess 38 formed intermediate the ends thereof which is adapted to communicate with port 39 formed in the wall of member 26 adjacent thereof. Port 39 is communicable with the chamber 13 through a valve opening to be described later.

Another longitudinal extending bore 40 is formed through member 26 and opens through the top thereof. A bore 41 of less diameter is aligned with bore 40 communicating through port 42 with the chamber 17 under piston 18. A rod member 43 is received within the bore 40, and the lower end thereof has an annular recess 44 formed therein which joins with a longitudinal flat portion 45 on one side of the rod 43 adjacent the lower end thereof. The lower end of member 43 abuts against a spring 46 which is disposed within the bore adjacent its point of communication with bore 41.

A passage 47 is formed in member 26 adjacent to flat 45 and aligned with the port 39. Another passage 48 is formed in member 26 aligned with passages 47 and 39. Passage 48 is adapted to establish communication between ports 39 and passageway 41, and passage 47 is adapted to establish communication between passageway 41 and chamber 12.

The upper end of rod 43 is pivotally connected to the underside of brake platen 5 by a pivot 49.

A valve sleeve 50 embraces member 26 and extends downwardly into bore 11. The sleeve 50 has a valve port 51 intermediate the ends thereof which upon movement is adapted to establish communication between chamber 13 and port 39. A rod 52 is fixed to the upper edge of sleeve 50 and is slidably received through an opening in platen 5 and is pivotally connected to the underside of platen 6 by means of pivot connection 53.

The sleeve 50 is also provided with a port 54, diametrically opposed to port 51 but at a lower axial position so that in the upper position of the valve sleeve passage 47 communicates with chamber 12 through port 54. Chamber 12 is at all times open to atmosphere through opening 55.

In the operation of the device so far described, upon application of the compound brake 4 by the operator depressing his left foot, the toe naturally tilts forward to first move the upper end of platen 6 toward platen 5 about pivots 8. This causes the valve sleeve 50 to move downwardly from the position shown in Fig. 2 to the position shown in Fig. 3. Vacuum is supplied through tube 15 to create a vacuum within chamber 13. Port 51 is at that time aligned with passage 39 so that vacuum is created around groove 38, through passage 48, around groove 44 to the space adjacent the flat 45. Vacuum is then created in passage 41 which communicates with chamber 17 through passage 42 so that vacuum is created under plunger 18 causing depression of the plunger to compress spring 19. This causes the initial actuation of the brake, and further depression of the platen 6 causes depression of platen 5 to move the enlarged end of plunger 28 downwardly in cylinder 20 to effect a further actuation of the brake. The brake fluid within the master cylinder 20 passes through conduit 27 to the individual brakes in the usual way. At this time, the port 54 on sleeve 50 has been moved downwardly so that passageway 47 is closed, thus closing communication with atmosphere. The pressure of the brake fluid under plunger 28 acts upon the enlarged lower end 32 of the rod 31 tending to move the rod 31 upwardly against the action of spring 36. This tends to reduce the effective vacuum within chamber 17 as passageway 38 is moved upwardly slightly with respect to port 39, as the brake pressure increases.

The normal feel of the brake is maintained through the resistance of the oil in cylinder 20 to movement of plunger 28 supplemented by the action of spring 19 tending to force the rod 43 upwardly through its connection with the plunger 26. Upon release of the brake 4, by releasing foot and consequently depressing the heel, the platen 5 is returned to the position shown in Fig. 2 at which time communication between port 39 and chamber 13 is cut off, and communication between passage 47 through port 54 is established with the atmospheric chamber 12. Atmospheric pressure is immediately established in the chamber 17 and piston 18 moves upwardly to return the platen 5 to its original position through the action of spring 19. The accelerator pedal 2 is connected to the fuel-feeding means of the engine through an assembly generally indicated at 60.

The assembly 60 is suitably fixed to the vehicle adjacent the assembly 9 and on the underside of the floor board 1. It comprises a cylinder 61, having an upper chamber 62 which opens through the upper end thereof and having a lower piston chamber 63. An actuating rod 64 is pivotally connected adjacent the upper end thereof to the underside of the accelerator pedal 2 by a pivot 65. The rod 64 extends downwardly through axial openings 66 and 68 in the cylinder 61. The actuator rod 64 has a longitudinally extending, axial passageway 69 formed therein between the ends thereof, the end of such passageway opening into the spaces around annular recesses 70 and 71 formed on the rod 64. A plunger sleeve 72 embraces the rod 64 and has a piston 73 formed or fixed on the lower end thereof which is reciprocably received in chamber 63. The upper end of the sleeve 72 extends through opening 66 and the inner surface of the sleeve between the ends through which the rod 64 extends is spaced from the outer periphery of rod 64 to provide an annular fluid chamber 74. The sleeve 72 is provided with a port 75 adjacent the top of plunger 73 which communicates space 74 with the space above the plunger 73 within chamber 63. A port 76 is formed through the cylinder 61 communicating with chamber 63 above plunger 73 and a fluid conduit 77 communicates the port 76 with the interior of the vacuum cylinder 17 through port 78. Thus when vacuum is established in chamber 17 under piston 18, it is simultaneously established within the chamber 63 above the piston 73.

A coil spring 79 is disposed within chamber 63 with one end thereof abutting against the upper surface of plunger 73 and the opposite end thereof abutting against the adjacent face of the wall separating chambers 62 and 63. A spring 80 also embraces the upwardly projecting portion of the sleeve 72 and the rod 64, with the lower end thereof terminating above an annular shoulder 81 formed on the sleeve 72, when the piston 73 is in its down position, and with the upper end thereof abutting against and connected to the under surface of the accelerator pedal 2.

The rod 64 projects beyond opening 68 and extends within a plunger chamber 82 of another cylindrical connector member 83. The member 83 has a reduced cylindrical portion 84 and another cylindrical portion 85, which is further reduced. Thus there is a space surrounding that portion of the pin 64 within reduced portion 84 with the lower end of the pin 64 slidably received within the reduced portion 85. A vent hole 86 is formed adjacent the bottom of the space within reduced portion 85 so that freedom of movement of the lower end of the rod 64 and a free relative axial movement between member 83 and rod 64 are permitted.

A plunger 87 is disposed within the chamber 83 embracing the rod 64 and floating longitudinally thereon. The rod 64 has an annular projection 88 formed thereon which is received within the chamber 82 above the plunger 87 and against which the plunger 87 is urged by a coil spring 89. The space within chamber 82 above the plunger 87 is vented to atmosphere through a port 90.

The lower end of the member 83 is in the form of a rod projection indicated at 91 which is adapted to be connected through suitable linkage to the carburetor. Thus, by depression of the rod 91 the carburetor is actuated to accelerate the car. When it is returned to the position shown in Figure 2, the car is de-accelerated with the engine idling.

In the combined operation of the accelerator connection, above described, with the braking means, it will be appreciated that when the brake is applied, as described above, a vacuum is created in chamber 17. Due to the open connection between chambers 63 and 17, a corresponding vacuum is created in chamber 63 which effects an upward movement of the plunger 73 to the position shown in Fig. 3. At the same time a vacuum is created within space 74, through port 75, and is at the same time created within passageway 69 and within the cylinder 83 under piston 87. This causes downward movement of the piston 87, as shown in Fig. 3, and moves the piston away from abutment with the shoulder portion 88 on the rod member 64. This in effect breaks operative connection between rod 64 and member 83 with the rod 64 free to move relative to the member 83 without having any effect on the operation of the carburetor. It will be evident that when the pedal 2 is depressed it will only be effective to operate the carburetor when there is the direct connection between the rod 64 and the member 83 through abutment plunger 87 against projection 88 and the connection between spring 89 and member 83 as shown in Figure 2. When the elements are in that position, depression of the pedal 2 causes downward movement of the rod 64 and consequent movement of the rod 91 to effect operation of the carburetor, or fuel-feeding means.

Thus whenever the brake is applied, by tilting the platen 6, the operative connection between the accelerator pedal 2 and the carburetor actuating means is broken. However, as soon as the brake is released, atmospheric pressure is again created within chamber 17, as described above, and is furthermore re-established through the same lines described above in chambers 63 and 83. This immediately causes the plunger 87 to re-establish its connection with the enlarged portion 88 at any position that the rod 64 may be in between idling and fuel throttle position to immediately re-establish fuel feeding for that particular position.

When vacuum is created in chamber 63, the upward movement of the sleeve 72 acts to engage and compress spring 80 so that the feel is always retained in the accelerator pedal.

In the embodiments illustrated, seals have not been shown for sealing the spaces between the various relatively moving parts. However, such seals are well known to those skilled in the art and will be understood as contemplated.

Figure 4:
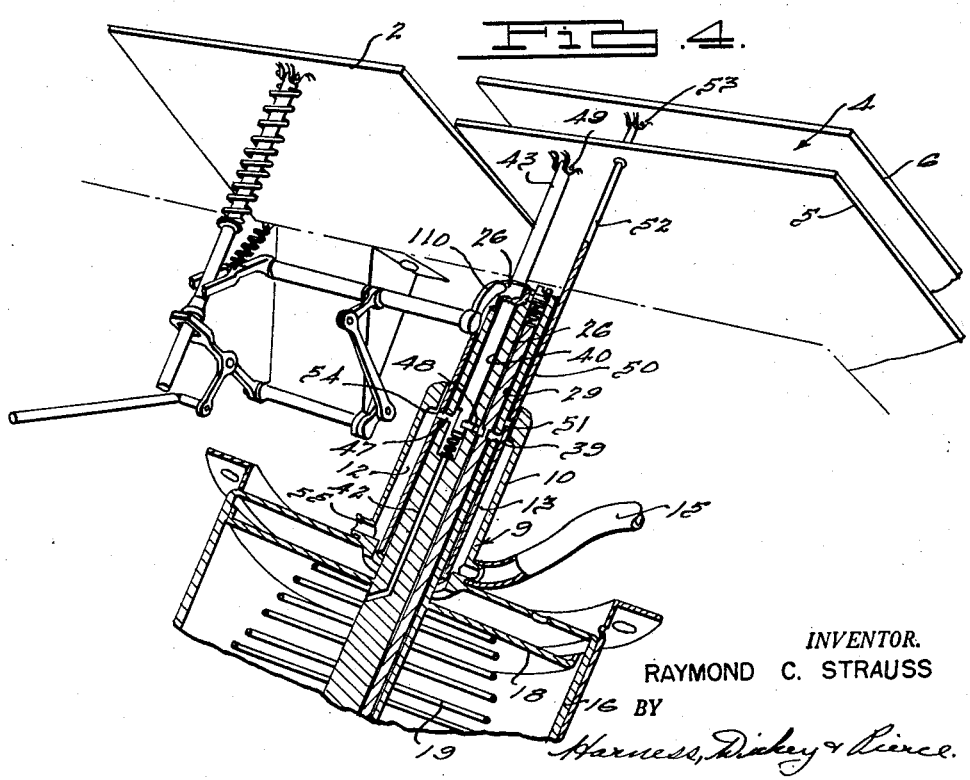
Fig. 4 is a view similar to Fig. 2 and illustrating a modified form of the present invention.

Referring to Figs. 4 and 5, another embodiment of the present invention is illustrated. The braking means, including the power means 9, is employed in this embodiment and its operation is the same as that above described. The details are shown in Figs. 6 to 9 and it will be seen that a latching means is employed which may be used with either of the embodiments here illustrated and which is particularly contemplated for use with the embodiment shown in Figs. 4 and 5. Such latching means includes a plunger or detent 95 having a tab 96 formed on the inner end thereof which is slidably received within a chamber 97 formed in a lateral projection on cylinder 10. The sleeve 50 is formed with a longitudinally extending groove 99 which terminates adjacent the lower end thereof in an enlarged opening 101. The tab 96 is slidably received within the slot 99 and the projecting end of the plunger 95 may be received within the enlarged opening 101 when the sleeve is in its upper position. Cam tapers 102 are formed on the sleeve 50 at the entrance to opening 101 as shown in Figs. 7 and 9.

The spring 103 urges the plunger to its inward lateral position. The member 26 is formed with a tab recess 104 therein which is adapted to receive the tab 96 when the member 26 and the pedal 5 are in their upper or released positions. At this same position, the sleeve 50 is in its upper position so that the parts assume the relationship shown in Fig. 8. The parts retain that position until the upper platen 6 is depressed which causes outward movement of the plunger detent 95, releasing the member 26 so that it may be moved downwardly to apply the brakes.

In Figs. 4 and 5, a linkage means is illustrated interconnecting the accelerator pedal 2 with the carburetor or fuel-feeding means. In this embodiment, the rod 105 and the rod 106 correspond to the rods 64 and 91, respectively, in the embodiment above described. That is, the rod 106 is connected to the carburetor for actuating it.

A depending bracket 107 is fixed to the inner surface of the floor board 1, and has rotatably mounted thereon rocker shafts 108 and 109. An upwardly and laterally projecting finger 110 is fixed to one end of the shaft 108 and a rocker arm 111 is also fixed to the shaft 108 intermediate the ends thereof. The rocker arm 112 is fixed to one end of shaft 109 and another rocker arm 113 is fixed to the opposite end thereof. The rocker arms 111 and 112 are pivotally connected to a link 114. The outer end of rocker arm 113 is pivotally connected to a bellcrank lever 115 at pivot 116. One of the arms of the bellcrank lever 115 is pivotally connected to a bent end of the rod 106 as indicated at 117. The outer end of the other arm of the bellcrank lever 115 is formed with an opening 118 through which the lower end of rod 105 slidably projects. An annular shoulder 119 is formed on the rod 105 which is adapted to abut against the upper surface around opening 118.

A bifurcated arm 120 is fixed to the opposite end of rock shaft 108 with the forked end thereof embracing the rod 105. A spring 121 embraces the upper end of rod 105 and has a washer 122 fixed to the lower end thereof which is adapted to resiliently bear against the upper surface of the forked end of arm 120. The upper end of spring 121 abuts against the under surface of pedal 122 adjacent the pivotal connection between it and rod 105.

A spring 123 has one end thereof fixed to the depending bracket 107 and the opposite end thereof fixed to the arm 120 so as to resiliently urge the rock shaft 108 to turn in a clockwise direction, as viewed in Figs. 4 and 5.

In the operation of this device, the brake operates in the same manner as that described above in connection with the embodiment shown in Figs. 2 and 3. In Fig. 4, the parts are shown in their initial position, that is, when the brake is released and when the accelerator pedal is in its idling position. The arm 110 is in a position so that it bears against the outer surface of the sleeve 26 adjacent the top thereof. When in this position, the forked arm 120 is in its released, downward position and the bellcrank arm adjacent the opening 118 urged against the annular projection 119. It will thus be seen that with the brakes in their releasing position any depression of the pedal 2 will cause the bellcrank 115 to rock about its pivot 116 and operate the fuel-feeding means in the usual way, through a proper connection between shaft 106 and the fuel-feeding means. However, when the brake is applied, the sleeve 26 is moved downwardly to the position shown in Fig. 5, at which time the spring 123 acts to rock the arm 108 in a clockwise direction. This is permitted since the finger 110 is removed from engagement with the sleeve 26. When in this position, the forked end of arm 120 engages the washer 22 so that the downward movement of the pedal 2 is resisted by the spring and the feel of the accelerator pedal is retained. At the same time, the bell crank lever 115 is rotated by rocker shaft 109 to the position shown in Fig. 5 which moves the carburetor to its idling position and moves the arm having the opening 118 therethrough away from engagement with the annular shoulder 19, thus dis-establishing an operative connection between the rod 105 and rod 106. When the brake is released, the connection between the arm around opening 118 and the annular projection 119 will be immediately re-established at any position of the rod 105, and consequently any position of the accelerator pedal. Thus, when the brakes are released with the accelerator pedal fully depressed, for example, fuel-feeding is re-established to the engine at full throttle.

The aforementioned constructions have a number of features that contribute to the comfort and safety of driving. It is evident, of course, that the time required to apply the brake is reduced a precious amount, since the braking foot is already in position. Also, the disconnect removes the possibility of joint braking and accelerating in the event of a crisis wherein the natural reaction of the driver is to jam both feet and legs toward the floorboard. Conscious thought is not required to properly apply the controls in an emergency since the system utilizes natural or instinctive movements, a fact demonstrated by the ease with which beginning drivers acquire skill in driving with the present system. Nervous shock to the driver in ordinary driving is eliminated by the use of a disconnect means (this term including also the supplementary throttle type of application Serial No. 639,245) which does not change the accelerator feel and which reconnects at the then applied position of the accelerator pedal. When on hills instant reacceleration, or hill holding, can be obtained by conscious control of the tilting so that the disconnect is not effective, thus enabling the motor to take over as soon as the brakes are released.

A number of features contribute to the comfort of driving and to the extent that they likewise promote a sense of security and confidence very likely contribute also to the safety of driving with the present controls. Among these features is the support of the brake pedal (this term being used to indicate the assembly of elements moved by the braking foot) so that the braking foot can rest on it or ride the brake, this being accomplished above by the plunger 95, which support is overcome by application of braking pressure by the foot. There is also a force provided to assist in lifting the foot and brake pedal back to released position. Also, a natural foot and leg motion is used to operate the brake. The brake pedal is also placed on a low, comfortable level and its operating stroke has been reduced to the equivalent of the accelerator pedal stroke giving a balanced comfortable feel. The effect of these features is to change the brake applying motions from a lifting and thrusting by the thigh muscles to initial foot rotation about the ankle bone and a stiffening of the toe area, this combination being much more sensitive in feel to pressure changes in the brake system and much more responsive and readily controlled than the leg and thigh muscles such as are used in ordinary braking systems. It is, of course, much easier to push the legs than to pull them, a fact observed in using the present driving systems with amputee drivers, and from this standpoint the fact that the accelerator leg need not be pulled back to reconnect the accelerator or to apply or release the brake provides much more comfort in driving. Since natural toe tilting disconnects the accelerator, the braking foot becomes a part of normal cruising controls since it may be used easily to let the engine slow the automobile speed and without releasing the accelerator pedal. Further comfort is evident in backing up with the present controls since the body and shoulders are freed for rotation to look toward the rear whereas with ordinary controls the necessity of maintaining the feet in proper poised positions prevents easy rotation and allows only a strained turning of the body.

In the foregoing illustrations, left-foot braking arrangements have been confined to double-top treadles, with the brake and accelerator tops at the same level. Numerous innovations on this idea and various improvements are possible, some being shown in Figs. 9–14, others in my copending applications, and still others will appear to those skilled in the art.

For example, Fig. 9 shows a set of controls composed of a left-foot brake and right-foot accelerator and generally designated as 150, which have fanlike upwardly inclined surfaces, so that brake top 151 and accelerator top 152 accommodate the natural outward-flaring position of the driver's relaxed feet, the controls each having laterally extending heel rests 153 and 154 for withdrawal or advance of the foot to the most comfortable ankle position, for any given driver. Floorboard section 155, rising in its inclined portion to a higher level than 151, serves as an outboard side barrier for the braking foot as well as a mounting for dimmer switch 156, which can be operated from the brake by pivoting the left foot about the heel while a similar section 157 serves as an inboard side barrier for the accelerator foot.

Some beginning users of the left-foot braking arrangement, it has been found, are inclined to grope for a high-level right-foot brake the first few times the brake is operated. Raised triangular platform 158 superimposed and firmly affixed to brake top 151 satisfies this initial need and thereafter serves as a barrier between the two feet so that along with the flanking floorboard sections 155 and 157 means are provided to ensconce the two feet in grooved areas which permit the driver to recognize by feel the proper location for his or her feet.

Cross-sectional view, Fig. 10, taken at lines 10—10 of Fig. 9 through the brake treadle 151, shows the several levels employed to give the driver maximum comfort. Inclined accelerator 152 of accelerator treadle assembly 161 is shown to be somewhat more withdrawn than the brake top 151 since the most used, high-gear accelerator position is about 25 m.p.h., and to achieve this speed in the most relaxed ankle position, i.e. the released position of the brake, speeds below 25 m.p.h., require withdrawal of the accelerator as far as to the idling position shown somewhat above the brake.

Brake treadle assembly 162 in Fig. 10 is shown to be pivoted upon floor-mounted stanchion 163 at point 164 ahead of the heel so that foot weight with its center of gravity falling below and behind 164, tends to hold the foot in released position until toe pressure is employed for brake operation, thereby preventing drag of the brake shoes against the drums and at the same time allowing the foot to ride the brake. Lug 165 at the underside of accelerator top 152 provides a flexible connection to accelerator linkage 166 while lug 167 at the underside of brake top 151 provides a flexible connection to accelerator-disconnecting linkage 195, to be more fully described. Connection of brake assembly 162 to the master cylinder is not shown, but is assumed to be made in the customary manner.

While the Figs. 1–9 show the left-foot braking controls used specifically with a power brake to achieve a short braking stroke, it is assumed that certain of Figs. 9–16 are used with self-adjusting brakes or disc-type brakes, the latter two types offering a similar short stroke advantage, wherein the ankle of the operator's left foot is kept within a comfortable range of movement. Such braking improvements require a range of ankle movement for the braking foot no greater than that required of the accelerator foot, and a required pressure approximating that of the accelerator foot, so that in operation the two controls have a balanced feel, and the two feet do about the same amount of work in accelerating and decelerating the vehicle, these advantages being obtained in Figs. 1–9 by means of the booster mechanisms.

As a further refinement of the brake control shown in Figs. 9 and 10, a superimposed tiltable top may be added above a pivoted member 170 as shown in Fig. 11 wherein assembly 168 rides at pivotal point 169 on underarm 170, in turn pivotally mounted at 171 on floormounted stanchion 172. Assembly 168 bears in released position against the lower end of 170 which is suitably attached to the master cylinder and, when forwardly tilted, assembly 168 bears against abutment 173. Lug 174 attached to the underside of the inclined surface 175 of assembly 168 connects to disconnect linkage 195.

In operation relaxed foot weights fall behind pivots 169 and 171 and keep the treadle assembly 168 in a brake-released position. Initial pressure of the ball of the foot causes abutment 173 to be contacted by 175 and this results in disconnection of the accelerator from the carburetor by methods subsequently to be described, so that the vehicle can be moderately decelerated by the drag of the idled motor before further pressure, if needed, actually applies the brakes by tilting member 170 on pivot 171. This slight tilting of the toes is motion substituted for the customary removal of the right foot from the accelerator and moving of the foot to the brake in anticipation of brake application. Since drivers using their right foot for braking almost always poise their right foot over the brake to be in a safe position in readiness for a stop, which stop frequently is never required, a considerable amount of energy is saved when the just described tilting top 175 is employed instead of left-foot braking. The separate tilting, motor decelerating motion, as distinct from the subsequent heavier braking motion is quickly utilized by drivers, cutting the gas in and out with a much shorter movement than releasing of the accelerator, so that the accelerator becomes a speed governor while the tiltable portion of the brake becomes the immediate speed control.

Fig. 12 shows a further innovation of the treadle type left-foot brake, combining the features of Figs. 10 and 11, and adding a separated toe portion in the inclined section of the brake top, which, after being tilted to disconnect the accelerator, can then be thrust straight downward for heavier braking pressure. The tilting of the toe at the outset of the application of braking pressure is a natural movement and conscious effort is needed to avoid it. In this arrangement, top 177 carries depending arm 178 connected at its lower end to suitable accelerator disconnecting actuating means such as a flexible shaft used in the embodiments of Figs. 14–16. Underplaten 179, carrying similar depending arm 180 pivotally attaching at its lower end to brake arm 181, supports 177 pivotally at point 182, and joins pivotally at its upper edge to angled arm 183 at point 184. The arm 183 is formed integrally with the lower inclined portion 185 of the brake top and with the laterally extending heel-rest 186, the assembly, in turn, pivoting upon floor-mounted stanchion 187 at 188, there being a special recess 189 in the floor to clear the movement of arm 183. Brake arm 181 formed and mounted at its lower end in the customary manner, to operate the master cylinder, carries at its upper end right angled and apertured projection 190 for attachment therethrough of a flexible shaft housing which encases the accelerator disconnecting flexible shaft control.

Broken lines 192 and 193 on brake treadle assembly 160 of Fig. 9 indicate the separation of upper brake surface 177 and heel portion 185 when 177 of Fig. 12 is substituted for 151. In the downward thrust after tilting 177 the driver's foot is pressured directly from above so that any tendency to skid forwardly at the bottom of the stroke is eliminated.

Referring back to Fig. 9, accelerator link 166 is shown to be pivotally connected to crank arm 194 while disconnect control link 195, joining at its upper end to lug 167, Fig. 10, is shown to join at its opposite end to crank arm 196, carried, along with 194, upon the chassis mounted arm 197. Accelerator link 198 joins crank arm 194 at its lower end and at its upper end joins crank arm 199, which pivots on bracket 200 mounted on the motor block 201. Disconnect control link 202 joins crank arm 196 at its lower end and at its upper end joins crank arm 203, also pivotally mounted on bracket 200. A link 204 joined at one end to crank arm 199 projects across the motor block 201 where it joins crank arm 205 of the customary throttle valve carried in the carburetor 206. Link 207 joined at one end to crank arm 203 projects across the motor block to join carburetor mounted crank arm 208, for operation of a supplementary throttle valve type disconnect within the carburetor (see my application Serial No. 639,245). A pull-back spring 209 connects at one end to crank arm 199 and at the other end to the motor block 201.

In the operation of the driving control, linkage, carburetor arrangement shown in Fig. 9, it is evident that pressure upon the accelerator 161 causes the carburetor throttle valve to open and the motor of the vehicle to accelerate. Under such conditions, if pressure is also applied to the brake 162 crank arm 208 on the carburetor will cause a secondary throttle within carburetor 206 to close the main passage of the carburetor, as fully described in my copending application Serial No. 639,245, filed January 5, 1946, and release of 162 will cause the secondary throttle to again open and allow the motor to reaccelerate in response to the open position of the primary throttle valve. To control the rate of reopening the secondary throttle valve so that reacceleration is not sudden or jerking, a motor-mounted dashpot arrangement with restricted air opening, 209', shown in broken lines, with or without a by-passing bleed valve to slow down the dashpot piston return may be incorporated, in the linkage, as in link 202, it being possible to incorporate a restriction in channel 69 of shaft 64, Fig. 2, of this application, or to provide a metering return arrangement such as that incorporated in my copending application Serial No. 31,156, filed June 4, 1948, in which both a dashpot and by-passing bleed valve are shown to control the re-acceleration rate of the motor.

Where no secondary throttle is employed, it is possible to float a slack-spacing, disconnecting diaphragm, piston, solenoid, or mechanical linkage unit 210, shown in broken lines on link 204, or elsewhere in the connection between the accelerator pedal and carburetor, to effect closure of the carburetor passage by closing of the primary throttle valve, in a manner similar that shown in my copending application Serial No. 533,274, filed September 8, 1944, my copending application Serial No. 639,245, filed January 5, 1946, and my copending application No. 31,154, filed June 4, 1948, as well as in Figs. 2, 3, 4, 5, 13, 14 and 15 of this application, it being especially preferable to use units which do not result in change in foot feel of the accelerator and which reconnect at the adjusted position of the accelerator without any resetting being required. Except where control of vacuum is through the valving control of a power brake, as in the preceding figures of this application, a separate valve, switch, or mechanical linkage, may be actuated by link 207 terminating in motor-mounted valve housing 211, or in mechanical linkage such as Fig. 4 of this application, there then being no connection of shaft 207 with carburetor 206. A tube, electrical wire, link, or other power transferring means 212 would then operatively interconnect units 211 with disconnect 210.

Control valve or linkage 211 and slack producing disconnect unit 210 may be mounted at some pivotal point such as bracket 200 in a manner similar to Fig. 4 of this application or to that employed in my copending application Serial No. 553,274, filed September 8, 1944. These two units, furthermore, may even be made integral with the driving controls, wherein valve, switch, or linkage control unit 213, shown in broken lines, may be incorporated under brake treadle assembly 162 at or behind the mounting pivotal point 164 for said brake treadle, to control the slack-producing motion of unit 214, also in broken lines, mounted integral with and under the accelerator treadle assembly 161, as shown in my copending application No. 31,156, filed June 4, 1948.

Other forms of left-foot braking controls may be used with the variously located disconnects of Fig. 9. For example, in Fig. 13, there is shown a thrust type brake arm 225, pivoted to connect at its lower end with the master cylinder in the usual way, into the side of which there is cut detent 226, and to the top of which is integrally joined laterally extending arm 227, whereon is pivotally mounted brake treadle assembly 228 at point 229 so that the unit is akin to that shown in my application No. 31,156. A switch 230 mounted to the underside of arm 227 by means of rivets 231 projects with finger 232 through opening 233 in arm 227 for yieldable contact with the underside of the inclined portion 234 of brake treadle 228. A depressed floorboard section 235 is inserted in the usual floorboard of the driving compartment to accommodate the downward movement of treadle 228, through which 225 projects by way of opening 236, and carries flexible shaft housing 237 inserted through a downwardly turned edge 238 of opening 236, the end of flexible shaft 239 extending therefrom for engagement with detent 226. Switch 240 is also carried by depressed section 235 through opening 241, a cap nut 242 locking switch 240 thereto, the switch having projecting finger 243 yieldably contacting the lower portion of brake arm 225.

A solenoid actuated, accelerator disconnecting unit generally designated as 244 is also shown in Fig. 13.

Solenoid form 245, preferably of non-conducting or non-magnetic material, is threaded into cylinder housing 246, to form an enclosing end, the cylinder having bearing openings 247 and 248 at its axial center to accept shaft 249. A cuplike projection 250 at one end of cylinder housing 246 has port opening 251 and is threaded to accept bleed housing 252 through the end of which is cut port 253. Check ball 254 normally seats upon port 251, held in position by spring 255 bearing at one end upon ball 254 and at the other against the inside of housing 252. A large port 256 is cut into end 257 of cylinder 246. A small bleed port 258 communicating the inside of cylinder 246 with the outside of cylinder 246 is cut through opposite to port 251 and projecting arm 259 is welded to the outside surface of the cylinder to carry flexible shaft housing 237 through opening 261.

Shaft 249 has formed in one end eye 262 to pivotally engage one projection of T-shaped lever arm 263, a bumper collar 264 being formed inwardly of said end, the stock of shaft 249 beyond collar 164 being slidably telescoped into longitudinal bearing opening 265 of piston shaft 266. Shaft 166 carries, adjacent collar 264, downwardly projecting arm 267, and upwardly projecting arm 268 through which passes the end of flexible shaft 239 via hole 270, being held therein by setscrew 271.

Piston plate 272 is threaded to an intermediate point on the shaft 266, flexible piston ring 273 being carried on the outer periphery of a threaded recessed area on piston plate 272, gripped and sealed against the shoulder of said recess by cooperating threaded ring 274. Spring 269 bears at one end against plate 272 and at the other end against solenoid form 245. The diameter of shaft 249 is slightly reduced from piston plate 272 to the end of the shaft passing through bearing opening 248 into solenoid 245 where slidable soft iron core 275 is threaded to the outer surface. A linkage shaft 276 connecting at one end to the carburetor throttle valve arm 277 threads at its opposite end into threaded opening 278 of the end plate of solenoid form 245. A pullback spring 279 connects at one end to throttle arm 277 and at the other end to a suitable projection on the carburetor throat 280.

In order to substitute a resistance during disconnection for that of spring 279, so that there is no change in foot feel of the accelerator, shaft 281 carriers eye 282 for pivotal engagement with the lower end of T-shaped arm 263, and passes through opening 283 of arm 267, and has washer 284 and compression spring 285 equal in effective tension to expansion spring 279, carried thereon, the opposite end of 281 being capped by mushroom end 286. Projection 287, partially shown, of T-shaped arm 263 connects with the customary linkage from the accelerator, while stanchion 288 passing along the side of arm 267 affixed to motor block 289, supports T-shaped arm 263 at fixed pivotal point 290. A bumper arm 291 mounted on motor block 289 projects into the path of arm 267.

Grounded battery 292 connects via lead 293 through terminal screw 294 to switch 230 while terminal screw 295 connects through lead 296 to terminal screw 298 of switch 240. Terminal screw 297 connects through lead 299 to terminal screw 300 mounted on solenoid unit 244, while 244 is grounded through terminal screw 301 via lead 302.

In the operation of the mechanism so far described, brake arm 225 is shown to be in a released position resisted by the customary spring within the master cylinder, with the end of flexible shaft 239 seated in detent 226 and finger 243 pressured into switch 240 to close the circuit between terminal screws 297 and 298. Finger 232 remains extended upwardly against the underside of treadle surface 234 so that the electrical circuit is broken between terminal screws 294 and 295, and there is no flow of current from battery 292 to solenoid unit 244, and any clockwise motion, due to downward movement of the accelerator treadle in the driving compartment, to arm 287 of T-shaped lever 263 will be imparted to shaft 249, bearing upon collar 264, resisted by expanded spring 269, and transferred via form 245 to shaft 276, thence to throttle arm 277 to open the carburetor throttle valve. Movement of the assembly, composed of the cylinder 246 coupled to solenoid unit 244 and held against further expansion of spring 269 by the bearing of arm 268 against the end of arm 259, is limited in the direction of the carburetor by contact of arm 267 with bumper 291, which is located to permit full opening of the throttle. Release of clockwise pressure upon arm 287 causes the assembly to return to the position shown, due to the contraction of pullback spring 279, closing the throttle valve within the carburetor to idling position.

When toe pressure is applied to inclined treadle section 234 to rotate the assembly 228 in a counterclockwise direction about pivot 229, finger 232 is pressed downwardly through opening 233 into switch 230, thereby closing the contact between terminal screws 294 and 295 to cause a flow of current from the grounded battery to solenoid unit 244. Magnetic lines of force thereupon cause solenoid core 275 to move in the direction of the carburetor, pulling piston shaft 266 to compress spring 269, break the contact of collar 264 with the end of shaft 266, base arm 267 upon bumper 291, contact arm 267 with washer 284, and withdraw flexible shaft 239 from housing 237 at arm 259, so that the upper end of flexible shaft 239 is drawn into housing 237 away from contact with detent 226 in brake arm 225, permitting free and unrestricted downward braking movement.

After toe tilt with the results just described, further braking force applied by the operator results in the brake arm 225 being moved downwardly and finger 243 emerging from switch 240 and the circuit is broken between terminals 297 and 298, so that soft iron core 275 is no longer attracted toward the carburetor and spring 269 attempts to expand. However, such expansion of spring 269 is prevented by the bearing of flexible shaft 239 at its upper end upon the outer surface of brake arm 225 above detent 226, which acts as a cam to hold it in the flexible shaft housing, and the locked and disconnecting position of the cylinder-solenoid unit, 246—244 is held.

Movement of the accelerator treadle under this disconnected condition remains normal in resistance due to the action of spring 285, but there is no opening of the carburator valve. Clockwise rotation of T-shaped arm 263 causes spring 285 to resist compression, and since it is of the same tension as spring 279, now offering no resistance to 263, the resistance to movement of 263, nevertheless, remains the same.

In the movement of the piston ring 273 from the position shown toward the carburetor, check ball 254 is unseated and spring 255 is compressed so that air within cylinder 246 may escape through ports 251 and 253 as well as smaller bleed port 258. Air follows into the cylinder 246 behind piston ring 273 through port 256.

When downward, brake applying foot pressure is removed, brake arm 225 returns to the released position shown, and flexible shaft 239 moves back into detent 226 to provide a supplementary supporting resistance against the relaxed weight of the braking foot. Shaft 266 with piston 272 is then free to return to the position shown in Fig. 13 to seat against collar 264 and to cause arm 268 to base against the end of arm 259 through the expansion of spring 269, as well as to break the contact of arm 267 with bumper 291 and washer 284, thereby removing the resistance of spring 285 to subsequent clockwise movement of lever 263, now re-engaged with spring 279.

Such re-expansion of spring 269 causes air to be freely expelled through port 256 from cylinder 246. However, due to the reseating of check ball 254 over port 251 and the re-expansion of spring 255, outside air can only re-enter the cylinder above piston ring 273 through small and restricting bleed port 258, so that while the movement of piston shaft 266 was rapid toward the carburetor, it is now slow when moving away from the carburetor, and the stiffening up of the cylinder-solenoid assembly 246–244 causes throttle arm 277 to reopen at a moderate rate without sudden jerking of the vehicle, provided, of course, collar 264 has previously been moved by downward accelerator pressure to any throttle-open position.

Full release of the brake arm 225 and relaxed weight of the braking foot upon treadle assembly 228 is now sustained against downward movement of arm 225 by the frictional support of flexible shaft 239 with detent 226 along with the customary spring within the master cylinder or any other pullback spring arranged to return the brake pedal to released position. Weight of the relaxed foot causes assembly 228 to tilt clockwise about pivot 229, permitting finger 232 to emerge through opening 233, thereby again breaking the circuit between terminal screws 294 and 295, which had been re-established through release of the brake arm 225 to depress finger 243 and close the circuit of switch 240 through terminal screws 294 and 298.

While the solenoid unit is shown to be floated on the linkage between the accelerator and carburetor it obviously can be located and mounted at the floorboard where the flexible shaft 239 engages detent 226. This form of the accelerator disconnecting unit demonstrates the method employed to compensate for loss of resistance to the carburetor pullback spring. It is possible to eliminate the spring at the carburetor, and float the shaft 276, this design being subsequently explained in the following views. Although a double top brake is herein shown in Fig. 13, it should be evident that a single top brake can be employed with suitable change in switch contacts to close the circuit through downward movement of the brake arm 225, it also being evident that the supporting effect of flexible shaft 239 with detent 226 is a relative, and not an absolute support and can be partially or fully forced back for closing of the circuit or braking in the event the circuit should go bad. Since the pitch of the detent 226 is cam-shaped on its upper shoulder, it may be regarded as a means for assisting in lifting the foot of the driver upon breaking of the solenoid circuit so that supplementary power means, along with physical effort, or instead of physical effort, can be made to return the brake and foot to released position.

A broad braking pedal for use by either the left or right foot of the driver is shown in Fig. 14 with certain improvements of this invention connected thereto which incorporate the advantages of complete left-foot braking, along with certain other improvements for simplified driving.

Fig. 14 shows a driving compartment in which the accelerator and brake pedal are brought to approximately the same level, through either lowering the floorboard to permit a normal pedal stroke reserve, or raising the accelerator, with slight dimensional alterations in the steering wheel and seat position to maintain driving and seating comfort. A broad brake pedal 400 is employed, against which the driver may rest his or her left foot at all times. A dimmer switch 401 is carried outboard of the brake top for easy accessibility and to assist in placing and holding the left foot on the pedal. A higher level braking surface is provided in the form of an elevated pad 402 fixed to the lower level to serve either as a guide for the left foot or as a high-level brake for the right foot, so that the vehicle can be driven in the customary right foot brake manner, or in the simplified left-foot braking manner. An accelerator disconnecting unit 403 is carried on the accelerator linkage to the carburetor and is controlled by movement of the flexible shaft 404 connected with the brake.

Fig. 16 shows the brake 400 in a detailed side view wherein foot-rest surface 405 carries dimmer switch 401.

and a depending arm 406 at the lower end of which is formed pivot opening 407, surface 405 being pivotally mounted at 408 on the top end of brake arm 409, the lower end of 409 being carried pivotally in bearing support 410 attached to master cylinder housing 411. An arm 412 is mounted pivotally between its ends upon and near the lower end of brake arm 409, and an upwardly projecting ear formed integrally near the lower end of arm 409 carries flexible shaft housing 512 in line with eye 414 formed on the upper shoulder of arm 412 for engagement with one end of flexible shaft 404 and for the abutment of spring 413, the other end of spring 413 bearing against 412. A right angle extension on the upper end of 412 carries roller 415 on a pin 416 for engagement with cam shoulder 417 and detent 418 formed on the outer shoulder of bearing support 410. A bearing pin 419 projects through the opening in support 410 for pivotal engagement with the lower end of arm 409 and also separately pivotally engages lever 420, 420 being a separate unit from 409, the lower end of which engages shaft 421 which bears upon the piston within master cylinder housing 411. At an intermediate point on 420, pivotal opening 422 connects pivotally with the lower end of link 423, the upper end of 423 connecting pivotally with a pivotal opening formed in the lower end of arm 412 as well as with a shaft 425 joining at its upper end to pivot opening 407 at the lower end of depending arm 406.

In the operation of the mechanism so far described, brake arm 409 normally remains in the withdrawn position shown, due to upwardly holding pressure of the usual spring within master cylinder 411. Additional support in this position is actually gained through the weight of the operator's foot, which, in relaxed position, bears upon surface 405 at a point below the pivot 408 so that a rotational force is applied at the lower end of arm 406 in a clockwise direction, and a force is applied to shaft 425 urging it in an upward direction and arm 412 to be pressured in a clockwise direction to firmly seat its roller 415 in detent 418 on bearing support 410.

When the operator pushes down upon the brake surface 405, it is natural for him to slightly lift his heel and stiffen his toes so that the pressure is applied to the ball of the foot. This initial effort throws the center of foot pressure from below pivot point 408 to a position well above said pivot point, reversing the direction of force on the lower end of depending arm 406, so that the counterclockwise pressure, now applied, forces shaft 425 downwardly to rotate arm 412 counterclockwise about its pivot point to force flexible shaft 404 into housing 512 and to lift roller 415 from detent 418 at the same time forcing link 423 downwardly to rotate arm 420 about its pivot point 419 in a counterclockwise direction forcing shaft 421 to move at a rapid rate, thus moving the piston within master cylinder 411 in a brake setting direction.

Further downward pressure upon surface 405 causes roller 415 to ride upon shoulder 417 adjacent detent 418 thereby locking shaft 421 against any backward movement relative to brake arm 409. Now locked arm 412 causes downward pivoting of arm 409 to transfer motion via section 423 and arm 420 to move shaft 421 to advance into master cylinder at the same rate that brake arm is moved downwardly, a slower rate of movement with greater leverage effect than when 412 rotated about its pivot point.

This combination of movements, induced when the toe is tipped as the brake is applied, has the effect of first disconnecting the accelerator from the carburetor in a manner subsequently to be explained, and to rapidly advance the master cylinder piston to move the brake shoes and brake drums together, a movement which requires relatively light pressure and, at the same time, to free the brake arm from the resistance of a latching support. Continued downward pressure upon the brake now causes the brake arm itself to start downwardly, and since the pivoted brake top is no longer being rotated relative to the brake arm, the master cylinder piston advances into the master cylinder pressure chamber at a reduced rate and with greater leverage force to set the brakes. By thus delivering rapidly a large volume of fluid to the wheel cylinders of the vehicle under light pressure to bring the shoes and drums into contact before actual brake setting is begun, the stroke required to stop the vehicle is greatly reduced, making the brake pedal stroke of approximately the same length as that of the accelerator when moved throughout its range, without any loss in stopping power.

While disconnect units of several forms have been described in my already mentioned copending applications, there is here shown a unit generally designated as 403, Figs. 14 and 15, not only connected to the brake for disconnect action upon the carburetor but is also connected to the transmission and directly to the carburetor as well, to provide control of acceleration not only while braking but also while the automatic transmission shifts and while the motor is put under excessive loads.

Cylindrical housing 450 is divided at the center by radial wall 451 to provide two separate enclosed cylinder areas 452 and 453. A left cap end 454, having bearing opening 455 at its center, threads into the open end of cylinder area 452, while right bumper ring 456 threads into the open end of cylinder area 453. Bearing opening 455 accepts piston shaft 458 which has threaded to the end within cylinder area 452 a piston face 459 which is terraced and threaded at its outer periphery to carry piston ring 460 and locking collar 461 in a tight seal. A bumper collar 462 threads to the opposite (left) end of piston shaft 458 which, under certain conditions, bears against a surface of motor-mounted bracket 463 adjacent the opening 464 through which shaft 458 passes. Piston shaft 458 has bearing surface 465 drilled axially therethrough, and air channels 466 and 467 off center and parallel to 465. A bore 468 larger in diameter than 465 (Fig. 15a) is cut a limited distance into 458 at the end on which collar 462 is mounted, and a ring 469, having a center opening greater than the diameter of opening 465 is pressed into bore 468. A shaft 470, having a raised shoulder 471 whose outside diameter is somewhat less than the inside diameter of ring 469, is carried in bearing surface 465 and threads at its opposite end into cap plate 472 which carries a depending pivot eye 473 and which confines spring 474 against one surface of ring 469, Fig. 15a. One arm 475 of lever 476 pivoting upon motor block 600 through attached stanchion 478 is pivotally joined to eye 473, while the other arm 479 of lever 476, partially shown, joins to the linkage leading to the accelerator. An arm 480 carrying right angled bumper end 481 for contacting cap plate 472 is welded at its opposite end to the outer surface of insert 454. Spring 482 is confined between wall 451 and piston face 459.

Cylinder area 453 slidably carries cuplike piston 483, a spring 484 being confined between the end surface of 483 and wall 451 to urge piston 483 against bumper ring 456 threaded into the end of 453. A piston face 485, terraced and threaded at its outer surface to accept piston ring 486 and gripping collar 487 threads upon shaft 488 which has formed at its opposite end an eye 489 for pivotal engagement with the upper end of throttle shaft 490 carried by carburetor 491, there being a communicating port 602 drilled the length of shaft 490 as far as nipple shoulder 492 for connection to flexible hose 493 engaging at its lower end a suitable connection on manifold 494 and there being a spring 601 bearing against the inner end surface of cylinder 483 and one side of piston face 485 as well as bumper ring 477 threaded into the open end of cylinder 483.

Cylindrical surface 450 has formed thereon, at the lower left hand corner, shoulder portion 495 through which is drilled port 496 to communicate the interior of cylindrical area 452 with the outside of 450. Shoulder 495 is threaded in an enlarged drilled section above port 496 to receive housing 497 drilled in its end section with port 498 against which is seated confined check ball 499 held yieldably in this position by spring 500.

A valving block 501 is formed integrally atop cylinder housing 450 having cored therein U-shaped channel 502 communicating through threaded port 503 with the outside, a channeled area 504 communicating with a reservoir sustained, vacuum source of power (not shown) through port 505, an arm-shaped channel 506 communicating both ports 503 and 505 with cylinder area 452, and an arm-shaped channel 507 communicating both ports 503 and 505 with cylinder area 453. Bearing surfaces 508 and 509 are cut lengthwardly through the valve block on a common axis, larger bores 510 and 511 being drilled at opposite ends a limited distance into the block on the same axis and threaded at their outer ends to cooperate with housings 512 and 513 of flexible shafts 514 and 515. The end of flexible shaft 514 is press fitted into hole 516 of the enlarged head 517 on the end of slide valve 518 while the end of flexible shaft 515 is press fitted into hole 519 of the enlarged head 520 on the end of slide valve 519, there being cross communicating cuts 521 and 522 on the surfaces of slide valves 518 and 519 to register with the ends of channels 502, 504, 506, and 507, and there also being compression springs 523 and 524 confined between the enlarged valve heads 517 and 520 and the inner ends of drilled openings 510 and 511 to normally urge the valves 518 and 519 away from vacuum port 505.

In the operation of the mechanism so far described, it will be observed that in contrast to Fig. 13 no pullback spring is employed at 490, it being assumed the only pullback spring used would be confined to the accelerator pedal itself, not shown. Referring to the discussion on Fig. 13, it is evident that through the expansion of spring 482 in cylinder 452 of Fig. 15 that the piston 459 and all related parts are seated firmly against angle 481 of arm 480 so that any clockwise movement of arm 475 is conveyed directly to assembly 403. Expanded spring 484 conveys this motion to cuplike cylinder 483, and spring 601, in turn, conveys this motion to piston face 485 with resulting movement of shaft 488 and clockwise movement of throttle arm 490.

It will be noted that the accelerator lever arm 475 is shown to be in a more withdrawn position than throttle lever 490. Full vacuum within manifold 494, accumulated when the motor is not under heavy load, would further compress spring 601 to draw throttle lever 490 counterclockwise to a position parallel with that of lever arm 475. Consequently, it can be assumed that the position shown for lever 490 indicates a drop of vacuum through channel 602 whereupon, due to the motor being under heavy load, expanding spring 601 has advanced throttle arm 490 beyond the held position of the accelerator pedal and arm 475. Such independent movement of throttle arm 490 can be employed to advantage with automatic transmissions, as well as sliding gear manually controlled transmissions, when driven through torque converter or fluid drive units, wherein the driver is required to over accelerate the motor to induce the driven turbine member to catch up in speed with the driving member. Piston face 485 and its related parts largely compensate in motion for this condition with the result that the driver is able to reduce almost to the point of elimination any necessity for over acceleration adding noticeably to the comfort of the driver.

In automatic transmission requiring a release or easing up of the accelerator for a shift in gear ratio within certain speed ranges, the withdrawing action of the operator's foot can be substantially minimized through a withdrawing action of cuplike cylinder 483 at such times of shift so that the accelerator may be left relatively undisturbed in position. Fig. 15 shows spring 484 to be fully distended against the confined cylinder 483. Flexible shaft 515 and housing 513 extend from block 501 for attachment at the transmission, not shown, with the usual built-in governor controlled shifting valve, the movement of the shifting valve forcing flexible shaft 515 to move momentarily toward block 501 in which position it is shown to be compressing spring 524, as shown, and to register cut 522 with channel 504 whereupon vacuum entering via channel 507 into area 453 will momentarily compress spring 484 to move 483 toward wall 451, the position 483 is about to assume. Since the tripping action of the shifting valve within the transmission only pressures flexible shaft 515 for a brief interval, spring 524 quickly re-expands and valve cut 522 registers again with channel 502 for communication of atmospheric pressure with cylinder area 453.

In Fig. 15, flexible shaft 404 of Fig. 16 is shown to abut the end of flexible shaft 514 within housing 512, and to have moved valve 518 into block 501 compressing spring 523 and registering cut 521 with channel 504 for vacuum flow to cylinder area 452 via channel 506. This positioning of valve 518 occurs when surface 405 of Fig. 16 is tilted counterclockwise through the initial effort of the driver to depress the brake arm 409. Vacuum, in withdrawing piston face 459 and related parts toward wall 451 and in compressing spring 482, the action which in Fig. 15 is about to begin, causes air to enter area 452 via ports 498 and 496 after unseating ball 499 as well as via channels 466 and 467 to a lesser degree since restriction of air passage will here occur as ring 469 passes shoulder 471, shown in detail in Fig. 15a. Such movement frees light spring 474 from contact with cap plate 472 and brings bumper collar 462 to bear upon motor mounted bumper 463 so that the entire assembly 403 will induce throttle arm 490 to rotate counterclockwise to a closed position, such lightening of motor load permitting increased manifold vacuum to compress spring 601 to its fullest extent. Lever arm 475 can now be moved freely toward carburetor 491 without response of lever 490, and since there is no pullback spring at the carburetor in this arrangement, arm 475 can be exercised by the accelerator without change in resistance.

Release of braking pressure upon brake arm 409 in Fig. 16 permits re-engagement of roller 415 with detent 418 when the brake arm 409 is fully released. In that position spring 413 again expands allowing flexible shafts 404 and 514 to move away from block 501, permitting spring 523 to again expand and shift cut 521 to register with channel 502 for admission of outside air to area 452 above piston face 459 via channel 506. Spring 482 is then allowed to expand and drive piston shaft 458 at a rapid rate away from wall 451. Check ball immediately reseats over port 498 and air is driven from the area confined behind piston face 459 by way of channels 466 and 467 at a rapid rate, until such point where spring 474 begins to bear against cap plate 472 and restrictor ring 469 begins to pass shoulder 471, this position being shown in detail in Fig. 15a. Expansion of spring 482 and movement of piston face 459 is immediately slowed down, so that as light spring 474 begins to compress the assembly 403 will react to slowly, and gradually more rapidly, drive throttle lever 490 in a clockwise direction to a throttle open position, provided arm 475 is in a throttle open position. As soon as restrictor ring 462 and shoulder 471 have passed each other and spring 474 has become fully compressed air will again flow freely through channels 466 and 467, air finding its way through the compressed coils of spring 474. Subsequent expansion of spring 482 and movement of piston shaft 458 is then very rapid to the point where cap plate again seats against angle 481 of arm 480.

The above outlined reconnection action occurs whether the accelerator is partially accelerated or in a fully accelerated position, the reconnection, when the accelerator is fully withdrawn, being instantaneous, so that the reconnecting action when the accelerator is poised in a partially or fully opened accelerating position, is identical to manual manipulation of the accelerator for a smooth resumption of speed or acceleration from a stopped condition of the vehicle to a desired speed, i.e., the reconnection action causes the motor first to moderately accelerate to remove the slack and play in the drive shaft gears and wheels, and then to rapidly accelerate the motor so that no jerking will be felt by the passengers, a condition which duplicates the accelerating action of careful drivers who first open the throttle lightly before fully accelerating to the desired speed.

While the disconnect action of this unit is instantaneous, it should be pointed out that deceleration of the vehicle when the brake is initially applied, can be controlled in the same cushioned manner as reacceleration, the dashpot arrangement and bleed valves shown being utilized for the decelerating action. The transmission shift control elements confined within cylinder area 453 and the throttle compensating device confined within cylinder 483 may be separately mounted and used without the disconnecting mechanism confined within area 452. It should be noted that while vacuum is used as a source of power for decelerating the motor while the transmission shifts, it is also possible to use change of fluid pressure in the transmission instead, or a solenoid and switch unit. Each of these units contributes an improvement to the customary right-foot braking system as commonly employed.

The left-foot braking and driving system herein set forth, however, enables each of these elements to play an important part; for in the results of this time and motion study they all contribute materially to the elimination of driver motions, time required to execute the motions that are basically essential, and the elimination of fatigue, so that virtually all of the operator's efforts, outside of steering, may be more completely concentrated upon the two major problems of starting and stopping.

What is claimed is:

1. In a motor vehicle having motor fuel feeding means, vehicle control means comprising, in combination, brake means including first and second brake treadle members, means interconnecting said members for movement relative to each other, brake control means adapted to be connected to the vehicle brakes, means operably interconnecting said control means with said second treadle member to effect initial actuation of said control means, and separate means interconnecting said control means with said first treadle member to effect further actuation of said control means, an accelerator pedal, mechanism adapted to operatively interconnect the accelerator pedal with the motor fuel feeding means, and means operatively interconnecting said mechanism with said brake control means, said mechanism being so constructed and arranged as to render the accelerator pedal ineffectual upon actuation of said control means by one of said brake treadle members.

2. In a motor vehicle having motor fuel feeding means, vehicle control means comprising, in combination, brake means including first and second brake actuating members, means interconnecting said members for movement relative to each other, brake control means adapted to be connected to the vehicle brakes, means operably interconnecting said control means with said second actuating member to effect initial actuation of said control means, and separate means interconnecting said control means with said first actuating member to effect further actuation of said control means, an accelerator pedal, mechanism adapted to operatively interconnect the accelerator pedal with the motor fuel feeding means, and means operatively interconnecting said mechanism with said brake control means, said mechanism being so constructed and arranged as to render the accelerator pedal ineffectual upon actuation of said control means by one of said brake actuating members to apply the brakes and as to render the accelerator pedal effectual at any position thereof upon the release of the brake actuating members.

3. In a motor vehicle having a carburetor, vehicle control means comprising, in combination, brake means including first and second brake treadle members, means interconnecting said members for movement relative to each other, fluid operated brake control means adapted to be connected to the vehicle brakes, means operably interconnecting said control means with said second treadle member to effect initial actuation of said control means, and separate means interconnecting said control means with said first treadle member to effect further actuation of said control means, an accelerator pedal, means adapted to operatively interconnect the accelerator pedal with the vehicle carburetor, and means operatively connecting said interconnecting means with said brake control means, said interconnecting means including a fluid responsive means intercommunicating with said fluid operated brake control means to render the accelerator pedal ineffectual upon actuation of said control means by said second brake treadle member upon said initial actuation of said control means.

4. In a motor vehicle control having a carburetor, vehicle control means comprising, in combination, brake means including first and second brake treadle members, means interconnecting said members for movement relative to each other, fluid operated brake control means adapted to be connected to the vehicle brakes, means operably interconnecting said control means with said second treadle member to effect initial actuation of said control means, and separate means interconnecting said control means with said first treadle member to effect further actuation of said control means, an accelerator pedal, means adapted to operatively interconnect the accelerator pedal with the vehicle carburetor, and means operatively connecting said interconnecting means with said brake control means, said interconnecting means including a fluid responsive means intercommunicating with said fluid operated brake control means as to render the accelerator pedal ineffectual upon actuation of said control means by said second brake treadle member upon said initial actuation of said control means and being so constructed as to render the accelerator pedal effectual at any position thereof upon the release of the brake treadle members.

5. In a vehicle control means, a first brake treadle member adapted to be pivotally mounted along one edge on the vehicle floor, a second brake treadle member superimposed on said first member and pivotally connected thereto between opposite edges thereof substantially parallel to said one edge for relative movement with respect thereto, fluid operated brake control means, said control means including a cylinder having a piston therein, a fluid port, means providing a fluid conduit communicating with said cylinder on one side of said piston, means connecting said piston on the other side thereof with said first treadle member to effect actuation of said control means upon movement of said first treadle member, movable valve means adapted to control communication between said port and said conduit, and means connecting said movable valve means with said second treadle member to effect initial actuation of said control means upon movement of said second treadle member relative to said first treadle member, an accelerator pedal, means adapted to operatively interconnect the accelerator pedal with the vehicle carburetor, and means operatively connecting said interconnecting means with said control means, said interconnecting means including a fluid responsive means intercommunicating with said fluid operated control means to render the accelerator pedal ineffectual upon actuation of said control means by said second treadle member upon said initial actuation of said control means and being so constructed as to render the accelerator pedal effectual at any position thereof upon the release of the brake treadle members.

6. In a vehicle having fuel feed control means, the combination of mechanism for regulating the fuel feed control means, said mechanism including a disconnect device, a brake actuating means capable of manual and fluid operated actuation, fluid operated means for actuating the brake actuating means, a movable treadle actuating the brake actuating means, a second foot treadle operatively imposed on the first and movable therewith and relative thereto and engageable with an operator's foot, third means operatively connecting the second treadle to the fluid operated means to control operation thereof to energize or release the brake actuating means upon relative movement between the treadles, and fourth means controlled by operation of the third means for operating the disconnect device.

7. In a vehicle having fuel feed control means, the combination of mechanism for regulating the fuel feed control means, said mechanism including a fluid operated disconnect device, brake actuating means, fluid operated pressure cylinder and piston means for actuating the brake actuating means, a pair of relatively and jointly movable foot treadles imposed one upon the other whereby the upper is engaged by an operator's foot, said brake actuating means being capable of actuation by joint movement of said treadles, means operatively interconnecting the fluid operated disconnect and the pressure cylinder and piston means for simultaneous operation, and valve means operated by relative movement of the treadles for controlling the pressure cylinder and piston means.

8. In a vehicle having fuel feed control means, the combination of mechanism for regulating the fuel feed control means, said mechanism including a mechanical disconnect device, brake actuating means, fluid operated means for actuating the brake actuating means, a pair of relatively and jointly movable foot treadles imposed one upon the other whereby the upper is engaged by an operator's foot, said brake actuating means being capable of actuation by joint movement of said treadles, said brake actuating means including valve means for controlling the fluid operated means and actuated by relative movement of the treades, and a movable actuator for operating the disconnect device, said actuator being operatively connected to and moved upon actuation of the brake actuating means.

9. In a vehicle having a brake system and foot actuactuated fuel feed system, the combination of a disconnect device in said fuel feed system, a double foot treadle adapted to operate the brake system, and means interconnecting the foot treadle and disconnect device so that the latter is operated upon relative movement between the treadles whereby the fuel feed system is rendered substantially inoperative in spite of foot actuation during the application of pressure to the foot treadles.

10. A speed control for vehicles having a brake system and a food actuated fuel feed system comprising, in combination, a disconnect device for the fuel feed system, a double foot treadle, power operated means for operating the brake system, valve means for controlling operation of the power operated means, said valve means including a member connected to and moved by one of the treadles and another member connected to and moved by the other of the treadles, and a controlling connection between one of the members and the disconnect device whereby movement of this member actuates the device.

11. Vehicle driving controls comprising a brake pedal, yieldable means for returning the brake pedal to released position after operation thereof, an accelerator pedal, a support capable of holding the brake pedal in released position against the weight of a relaxed foot resting on the brake pedal, said pedals being positioned in alignment with different feet of a vehicle operator, and disconnect means actuated upon operation of the brake pedal for rendering the accelerator pedal ineffective as a control, whereby both feet of the operator may remain on their respective pedals at all times.

12. The invention as set forth in claim 11 wherein said pedals include lateral heel rests, said brake pedal in released position having an angle of inclination substantially the same as that made by the sole of a vehicle operator's braking foot when said foot is relaxed, and said accelerator pedal in about 25 m.p.h. position having an angle of inclination substantially the same as that made by the sole of a vehicle operator's accelerator foot when said foot is relaxed.

13. The invention as set forth in claim 12 including a raised platform on the brake pedal adjacent the accelerator pedal providing a brake pedal surface in a standard location to accommodate subconscious application of the brake pedal by the accelerator foot.

14. Vehicle driving controls comprising a brake pedal, yieldable means for returning the brake pedal to released position after operation thereof, an accelerator pedal, means connected to the brake pedal but not increasing the resistance thereof whereby the weight of a relaxed braking foot may be applied thereto without any substantial actuating movement of the pedal, said pedals being positioned in alignment with different feet of a vehicle operator, and disconnect means actuated upon operation of the brake pedal for rendering the accelerator pedal ineffective as a control, whereby both feet of the operator may remain on their respective pedals at all times.

15. The invention as set forth in claim 14 wherein said disconnect means includes means whereby disconnection by the disconnect means does not change the resistance to accelerator pedal movement and means whereby said disconnect means reconnects upon release of the brake pedal at the then applied position of the accelerator pedal.

16. The invention as set forth in claim 15 including dash pot means for slowing the rate of reconnection.

17. Vehicle driving controls comprising a brake pedal, yieldable means for returning the brake pedal to released position after operation thereof, an accelerator pedal, means connected to the brake pedal but not increasing the resistance thereof whereby the weight of a relaxed braking foot may be applied thereto without any substantial actuating movement of the pedal, said pedals being positioned in alignment with different feet of a vehicle operator, and disconnect means actuated upon operation of the brake pedal for rendering the accelerator pedal ineffective as a control, whereby both feet of the operation may remain on their respective pedals at all times, said brake pedal in released position having an angle of inclination substantially the same as that made by the sole of a vehicle operator's braking foot when said foot is relaxed, said accelerator pedal in about 25 m.p.h. position having an angle of inclination substantially the same as that made by the sole of a vehicle operator's accelerator foot when said foot is relaxed, and means whereby the operating stroke of the brake pedal is of substantially the same length as the operating stroke of the accelerator pedal.

18. Vehicle driving controls comprising a brake pedal, an accelerator pedal, said brake pedal including a tiltable portion engageable with the toe of a vehicle operator's braking foot and tiltable with respect to the normal brake operating movement of the pedal, disconnect means for rendering the accelerator pedal ineffective as a control, said tiltable portion being tilted upon initial movement of a braking foot when actuating the brake, and means operatively connecting said tiltable portion to said disconnect means whereby said tilting of said portion operates said disconnect.

19. Vehicle driving controls comprising a brake pedal, yieldable means for returning the brake pedal to released position after operation thereof, an accelerator pedal, said brake pedal including a tiltable portion engageable with the toe of a vehicle operator's braking foot, disconnect means for rendering the accelerator pedal ineffective as a control, said tiltable portion being tilted upon initial movement of a braking foot when actuating the brake, means operatively connecting said tiltable portion to said disconnect means whereby said tilting of said portion operates said disconnect, said pedals being positioned in alignment with different feet of a vehicle operator, and means connected to the brake pedal but not increasing the resistance thereof whereby the weight of a relaxed braking foot may be applied thereto without any substantial actuating movement of the pedal or tilting of said tiltable portion, whereby both feet of the operator may remain on their respective pedals at all times.

20. The invention as set forth in claim 19 including means mounting said brake pedal so that in released position it has an angle of inclination substantially the same as that made by the sole of a vehicle operator's braking foot when said foot is relaxed, and means mounting said accelerator pedal so that in about 25 m.p.h. position it has an angle of inclination substantially the same as that made by the sole of a vehicle operator's accelerator foot when said foot is relaxed.

21. The invention as set forth in claim 14 wherein said means connected to the brake pedal comprises a pivotal support for the brake pedal with the axis of pivot transverse to the operator's foot and located forwardly of the center of gravity of said foot in relaxed condition.

22. Vehicle driving controls comprising a brake pedal, an accelerator pedal, said brake pedal including a tiltable portion engageable with the toe of a vehicle operator's braking foot, disconnect means for rendering the accelerator pedal ineffective as a control, said tiltable portion being tilted upon initial movement of a braking foot when actuating the brake, means operatively connecting said tiltable portion to said disconnect means whereby said tilting of said portion operates said disconnect, two-stage brake operating mechanism operated by said brake pedal, and means operatively connecting said tiltable portion to said mechanism whereby the tilting actuates the first stage.

23. Vehicle driving controls comprising a brake pedal, yieldable means for returning the brake pedal to released position after operation thereof, an accelerator pedal, said brake pedal including a tiltable portion engageable with the toe of a vehicle operator's braking foot, disconnect means for rendering the accelerator pedal ineffective as a control, said tiltable portion being tilted upon initial movement of a braking foot when actuating the brake, means operatively connecting said tiltable portion to said disconnect means whereby said tilting of said tiltable portion operates said disconnect, said pedals being positioned in alignment with different feet of a vehicle operator, means connected to the brake pedal but not increasing the resistance thereof whereby the weight of a relaxed braking foot may be applied thereto without any substantial actuating movement of the pedal or tilting of said tiltable portion, whereby both feet of the operator may remain on their respective pedals at all times, and means whereby tilting of said tiltable portion renders said last-mentioned means ineffective.

24. Vehicle driving controls comprising a brake pedal, yieldable means for returning the brake pedal to released position after operation thereof, an accelerator pedal, said brake pedal including a tiltable portion engageable with the toe of a vehicle operator's braking foot, disconnect means for rendering the accelerator pedal ineffective as a control, said tiltable portion being tilted upon initial movement of a braking foot when actuating the brake, means operatively connecting said tiltable portion to said disconnect means whereby said tilting of said tiltable portion operates said disconnect, said pedals being positioned in alignment with different feet of a vehicle operator, means connected to the brake pedal but not increasing the resistance thereof whereby the weight of a relaxed braking foot may be applied thereto without any substantial actuating movement of the pedal or tilting of said tiltable portion, whereby both feet of the operator may remain on their respective pedals at all times, two-stage brake operating mechanism operated by said brake pedal, and means operatively connecting said tiltable portion to said mechanism whereby said tilting actuates the first stage.

25. Vehicle driving controls comprising a brake pedal, yieldable means for returning the brake pedal to released position after operation thereof, an accelerator pedal, said brake pedal including a tiltable portion engageable with the toe of a vehicle operator's braking foot, disconnect means for rendering the accelerator pedal ineffective as a control, said tiltable portion being tilted upon initial movement of a braking foot when actuating the brake, means operatively connecting said tiltable portion to said disconnect means whereby said tilting of said tiltable portion operates said disconnect, said pedals being positioned in alignment with different feet of a vehicle operator, means connected to the brake pedal but not increasing the resistance thereof whereby the weight of a relaxed braking foot may be applied thereto without any substantial actuating movement of the pedal or tilting of said tiltable portion, whereby both feet of the operator may remain on their respective pedals at all times, two-stage brake operating mechanism operated by said brake pedal, means operatively connecting said tiltable portion to said mechanism whereby said tilting of said tiltable portion actuates the first stage, and means whereby weight of a relaxed foot applied to said tiltable portion when the brake pedal is in released position helps support the relaxed weight of the braking foot.

26. The invention set forth in claim 25 including dash pot and bleed-off means for controlling the rate of disconnection and reconnection.

27. The invention set forth in claim 26 wherein said disconnect means includes means whereby disconnection does not change the resistance to accelerator pedal movement and means whereby said disconnect reconnects upon release of the brake pedal at the then applied position of the accelerator pedal.

28. Vehicle driving controls for a vehicle having an automatic transmission, comprising a brake pedal, an accelerator pedal, means for operatively connecting the accelerator pedal to the fuel system of a vehicle, said means including a disconnect device and a supplemental accelerating device, means operatively connecting the brake pedal to the disconnect device to operate the disconnect device during actuation of the brake pedal, and means connected to the transmission and responsive to change in power transmission ratios in the transmission operatively connected to said accelerating device to cause variations in fuel supply in accordance with changes in engine load.

29. Vehicle driving controls comprising a brake pedal, yieldable means for returning the brake pedal to released position after operation thereof, an accelerator pedal, means connected to the brake pedal but not increasing the resistance thereof whereby the weight of a relaxed braking foot may be applied thereto without any substantial actuating movement of the pedal, said pedals being positioned in alignment with different feet of a vehicle operator, and disconnect means actuated upon operation of the brake pedal for rendering the accelerator pedal ineffective as a control, whereby both feet of the operator may remain on their respective pedals at all times, a raised platform on the brake pedal adjacent the accelerator pedal providing a brake pedal surface in a standard location to accommodate subconscious application of the brake pedal by the accelerator foot, and raised side barriers alongside the outside edges of said pedals whereby the feet of the operator are ensconced on their respective pedals.

30. The invention set forth in claim 18 wherein said tiltable toe portion constitutes the only foot engaging surface of the brake pedal.

31. The invention set forth in claim 18 wherein said brake pedal includes a lateral heel rest separate from said tiltable portion.

32. The invention set forth in claim 11 wherein said brake pedal is substantially greater in width than an operator's foot and thereby readily accessible to both feet of a vehicle operator.

33. Control apparatus for an automobile or the like comprising the combination of a fuel control unit including a throttle valve, first means for operating the unit and adapted for connection to an accelerator whereby movement of the accelerator actuates the unit, second means for controlling the operation of the throttle valve and adapted for connection to a brake system whereby actuation of the brake system results in closing of the throttle valve, third means for controlling operation of the first means and adapted for connection to the brake system and constructed whereby actuation of the brake system renders the first means ineffective and at least partially disconnects the accelerator from the unit, and means whereby the resistance to movement of the accelerator pedal is substantially unchanged despite operation of the third means and disconnection of the accelerator from the unit, said last means including a substitute spring means for supplying resistance substantially equal to that removed upon operation of the third means.

34. In an automobile or the like the combination of a fuel control unit, an accelerator, a brake, a first operative connection btween the accelerator and unit whereby the accelerator operates the unit, a first spring system in said first connection providing resistance to accelerating movement of the accelerator in operating the unit through the first connection, said first connection including a device whereby the accelerator may be disconnected from at least part of the unit, said disconnection being accompanied by a change in resistance to movement of the accelerator, means connected to the brake and device and actuated during operation of the brake for operating the device, and a second spring system connected to the brake and device and actuated during operation of the device to counteract the change in resistance to movement of the pedal so that the resultant resistance on the pedal during disconnection is substantially the same as that provided by the first spring system.

35. Vehicle driving controls comprising a brake pedal, yieldable means for returning the brake pedal to released position after operation thereof, an accelerator pedal, said pedals being positioned in alignment with different feet of a vehicle operator, foot support means connected to the brake pedal whereby the weight of a vehicle operator's relaxed braking foot may be applied to the pedal without any substantial actuating movement of the pedal, said brake pedal including a tiltable portion engageable with a braking foot and tilted upon initial movement of a braking foot when actuating the brake, and means whereby tilting of said tiltable portion renders said foot support means ineffective.

36. Vehicle driving controls comprising a brake pedal, yieldable means for returning the brake pedal to released postion after operation thereof, an accelerator pedal, said pedals being positioned in alignment with different feet of a vehicle operator, said brake pedal including a tiltable portion engageable with a braking foot and tilted upon initial movement of a braking foot when actuating the brake, two stage brake operating mechanism operated by said brake pedal wherein the first stage causes the brake shoe to be brought into incipient engagement with the drum, and means whereby tilting of said tiltable portion actuates the first stage of said two stage brake operating mechanism.

37. Vehicle driving controls comprising a foot operated brake member, yieldable means for returning the brake member to released position after operation of the brake, an accelerator pedal, said member and pedal being positioned in alignment with different feet of a vehicle operator, foot support means connected to the brake member to hold it in released position against the weight of a relaxed foot resting thereon, and means other than foot pressure operated upon initial brake operating movement for rendering said foot support means ineffective.

38. The invention set forth in claim 37 wherein said last mentioned means includes an element movably carried by the member that moves relatively thereto during said initial brake operating movement, said element being operatively connected to said foot support means.

39. Vehicle driving controls comprising a brake pedal, an accelerator pedal, said pedals being positioned in alignment with different feet of a vehicle operator, said brake pedal being substantially wider than the foot of an operator and having a high portion located on the side thereof adjacent to the accelerator pedal, said brake pedal having a low portion on the side thereof remote from said accelerator pedal and located on a level such that it is substantially coplanar with the accelerator pedal at low speed positions of the accelerator pedal.

40. The invention set forth in claim 39 including short stroke brake mechanism operated by said brake pedal whereby the stroke thereof is no greater in length than that of the brake pedal.

References Cited in the file of this patent

UNITED STATES PATENTS

| | | |
|---|---|---|
| 1,152,257 | Young | Aug. 31, 1915 |
| 1,473,984 | Bailhe | Nov. 13, 1923 |
| 1,517,592 | Singrey | Dec. 2, 1924 |
| 1,832,125 | Hull | Nov. 17, 1931 |
| 1,886,672 | Good | Nov. 8, 1932 |
| 1,891,678 | Mayback | Dec. 20, 1932 |
| 1,919,930 | Cash | July 25, 1933 |
| 2,020,440 | Stein | Nov. 12, 1935 |
| 2,078,390 | Kumpf | Apr. 27, 1937 |
| 2,167,959 | Pomernocki | Aug. 1, 1939 |
| 2,200,685 | Anderson | May 14, 1940 |
| 2,203,777 | Detmer | June 11, 1940 |
| 2,309,051 | Dodge | Jan. 19, 1943 |
| 2,311,120 | Mossinghoff | Feb. 16, 1943 |
| 2,317,935 | Myerson | April 27, 1943 |
| 2,453,054 | Whiffen | Nov. 2, 1948 |
| 2,621,766 | Patrick | Dec. 16, 1952 |